United States Patent [19]

Grimm et al.

[11] 4,303,901

[45] Dec. 1, 1981

[54] ELECTROMAGNETIC FUEL CONTROL ELEMENT

[75] Inventors: Gerold Grimm, Leonberg; Ulrich Kemmner, Sachsenheim, both of Fed. Rep. of Germany

[73] Assignee: Robert Bosch GmbH, Stuttgart, Fed. Rep. of Germany

[21] Appl. No.: 97,258

[22] Filed: Nov. 26, 1979

[30] Foreign Application Priority Data

Feb. 21, 1979 [DE] Fed. Rep. of Germany ....... 2906566

[51] Int. Cl.³ ............................................. H01F 7/08
[52] U.S. Cl. ..................................... 335/272; 310/36
[58] Field of Search ................ 335/272, 68, 100, 125, 335/225; 310/36, 38; 200/DIG. 42

[56] References Cited

U.S. PATENT DOCUMENTS

| | | | |
|---|---|---|---|
| 2,671,863 | 3/1954 | Matthews | 335/272 |
| 3,452,309 | 6/1969 | Wilkes | 335/272 |
| 4,151,499 | 4/1979 | Ganowsky et al. | 335/272 |

*Primary Examiner*—Harold Broome
*Attorney, Agent, or Firm*—Edwin E. Greigg

[57] ABSTRACT

An electromagnetic final control element is proposed which serves to generate a repeatable rotary motion throughout a limited rotary angle. The electromagnetic final control element includes electrical current supply conductors connected between a plug on the housing and an armature which are formed as elastically deformable conductors secured at one end on an outer roller path body having an outer roller path associated with each current conductor and, on the other end, are secured on an inner roller path body with an inner roller path connected with the armature. Each outer roller path extends eccentrically with respect to the inner roller path whereby the distance between the inner roller path and the outer roller path increases in the roll-off direction of the current conductors from the outer roller path. Thus, it is possible to have an electrical current supply free of retrograde force between the plug and the armature. The ends of the current conductors are eyelet-like and are inserted into corresponding recesses in the inner roller path body and the outer roller path body, respectively. As a result of the contact pins inserted into the eyelet-like ends of the current conductors, there is a positive contact of the current conductors on the one end with the plug and on the other end with the armature.

5 Claims, 2 Drawing Figures

U.S. Patent
Dec. 1, 1981
4,303,901
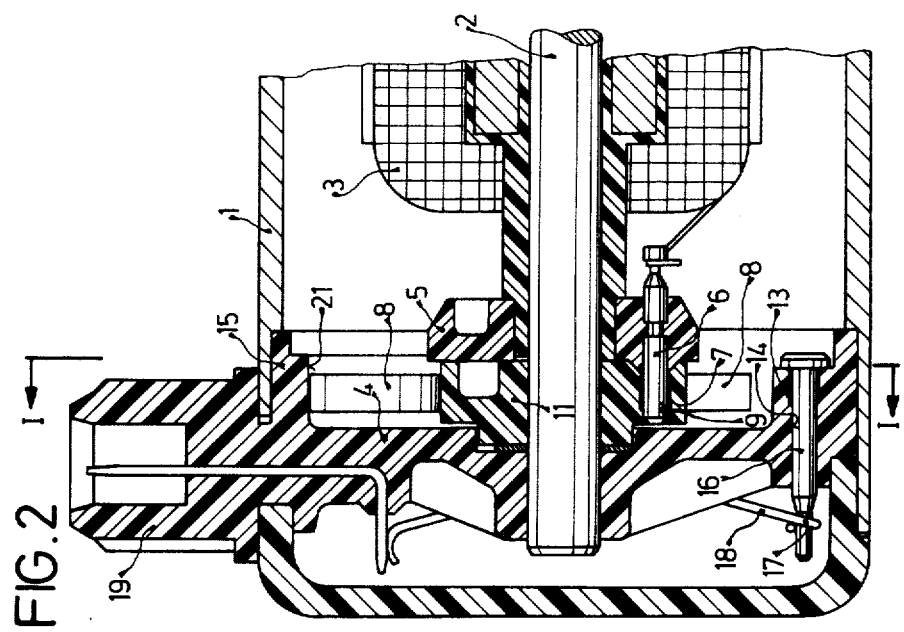
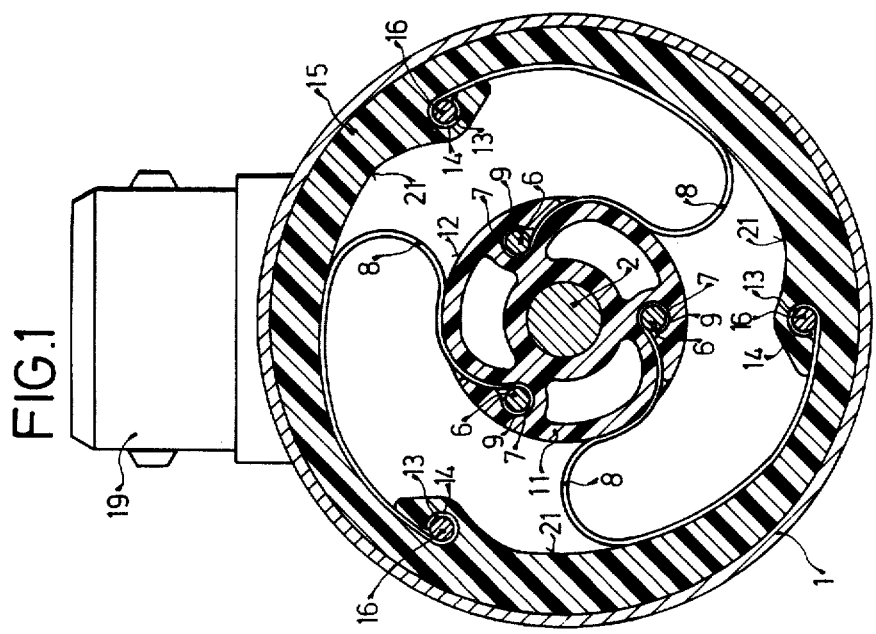

4,303,901

ELECTROMAGNETIC FUEL CONTROL ELEMENT

BACKGROUND OF THE INVENTION

The invention relates to an electromagnetic fuel control element. An electromagnetic fuel control element is well known but is known to generate retrograde forces as a result of the electrical current supply conductors. These retrograde or return forces cause errors in the rotary motion of the electromagnetic fuel control element, as a result of which, it is not possible to attain repeatable rotary motions through a limited rotary angle within a narrow range to tolerance.

The electromagnetic fuel control element may be used in a fuel injection apparatus for setting the fuel metering valve such as set forth in U.S. Pat. No. 3,916,842.

OBJECT AND SUMMARY OF THE INVENTION

The electromagnetic fuel control element constructed in accordance with the invention has the advantage over the prior art in that the repeatability of the rotary motion of the electromagnetic fuel control element can be substantially improved.

In the invention, it is particularly advantageous for the outer roller path to be embodied as extending eccentrically with respect to the inner roller path, in such a fashion that the distance between the inner and the outer roller paths increases in the roll-off direction of the current supply conductors from the outer roller path. As a result, the retrograde torque effected during roll-up on the inner roller path as a result of the flexing provided in the current conductors can be compensated for by means of the torque which arises as a result of the flexing tension in the loops of the current conductors between the inner and the outer roller paths.

Electrical current supply conductors which are formed as strip-like are particularly stable in contour.

It is likewise advantageous to provide the inner and the outer roller paths with recesses into which the ends of the electrical current supply conductors, provided with eyelets, are inserted and to provide an electrical contact with the current conductors in a positive manner by means of contact pins inserted into the eyelet-like ends of the current conductors, the contact pins being connected in an electrically conductive manner with the armature coil or a plug connection on the housing. As a result, plug connections are obtained without soldering, which simultaneously prevent twisting and are highly unlikely to break even under high pivoting stresses.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 1 is a cross-sectional view taken through the electromagnetic fuel control element of the invention along line I—I of FIG. 2 in the direction of the arrows; and FIG. 2 is a longitudinal sectional view taken through an electromagnetic final control element constructed in accordance with the invention.

DESCRIPTION OF THE PREFERRED EMBODIMENT

Referring now to FIGS. 1 and 2, there is shown an electromagnetic final control element for generating a repeatable rotary motion throughout a limited rotary angle. The electromagnetic fuel control element includes a shaft 2 supported in a housing 1 and securely connected with an armature 3. By means of the shaft 2, in a manner which is not illustrated, a member such as a fuel metering value which is to be actuated is adjusted. The shaft 2 is rotatably supported on its left-hand end in a bearing body 4, which transversely passes through the housing 1. A contact ring 5 securely connected to the armature 3 is disposed concentrically with respect to the shaft 2 and may be formed of any suitable material such as plastic or the like. Contact pins 6, extending parallel to the shaft 2 are inserted into the contact ring 5. An electrical connection of the armature coil 3 is accomplished via the ends of the contact pins 6 protruding beyond the contacting ring 5 such as by means of eyelet-like ends of the armature coil 3 which engage corresponding grooves in the contact pins 6. The other end of each contact pin 6 protrudes into an end 7, formed as an eyelet, of each electrically conductive supply conductor 8. The eyelet-like ends 7 of the current supply conductors 8 are inserted into appropriately formed recesses 9 of an inner roller path body 11 disposed concentrically to the shaft 2, so that, as a result of the contact pins 6, a rigid and twist-free contact of the current supply conductors 8 with the armature coil 3 is accomplished.

The outer surface of the cylindrical inner roller path body 11 serves as an inner roller path 12 for the current conductors 8. The ends 13 of the current conductors 8 remote from the inner roller path body 11 are also formed as eyelets, and are inserted into appropriately formed recesses 14 of an outer roller path body 15.

The outer roller path body 15 can be securely connected with the bearing body 4 and is disposed inside the housing 1 and secured therein against twisting. One electrically conductive contact pin 16 is inserted through the eyelet-like end 13 of each current supply conductor 8, with each contact pin 16 simultaneously passing through an eyelet 17 of a contact wire 18 which leads to a plug 19 through which the triggering of the electromagnetic final control element is effected.

Facing the inner roller path body 11, the outer roller path body 15 is formed with an outer roller path 21 facing each current supply conductor 8. The elastically deformable and preferably strip-like current conductors 8 are disposed in the form of loops between the inner roller path body 11 and the outer roller path body 15 in such a manner that, when the armature 3 rotates a rotary angle with respect to the housing 1, the current conductors 8 roll off on the one roller path body 11, 15 and thereby roll up on the other roller path body 11, 15.

It is advantageous to provide an outer roller path 21 which extends eccentrically with respect to the inner roller path 12 so that the distance between the inner roller path 12 and the outer roller path 21 increases in the roll-off direction of the current conductors 8 from the outer roller path 21. As a result of the eccentric arrangement of each outer roller path 21 with respect to the inner roller path 12, the flexing tension of the loop of each current conductor 8 exerts a torque force, in the counterclockwise direction in the illustrated embodiment, upon the inner roller path body 11. This torque acts counter to the retrograde torque exerted in the clockwise direction as a result of the winding of the current conductors 8 on the inner roller path body 11 and, with an appropriately formed roller path 21, entirely compensates for the retrograde torque, so that the supply of electrical current from the plug 19 to the armature 3 occurs without retrograde force. The embodiment of the electromagnetic final control element in accordance with the invention not only assures an electrical current supply, free of retrograde force, to an electromagnetically actuated armature for the purpose of generating a repeatable rotary angle, but also permits a solder-free plug connection with simultaneous prevention of twisting.

The current conductors 8 provide wear-free electrical connections for the armature which serve in place of carbon brushes normally used with an armature. Since the conductors 8 follow the curvature of the bodies 11 and 15 during rotation of the armature through its rotary angle, the conductors are made of an elastic material in order to return the rotary elements in their rest position. It is obvious from the operation of the device that an electrical current applied to the armature through the conductors 8 will cause the armature and roller path body 11 to rotate through a certain rotary angle. As the armature and roller path body 11 rotates, the conductors held at one end by the contact pins in body 15 are rolled upon the roller path body 11. When the current is no longer applied to the armature, the elasticity of the conductors will return the armature and roller path body to their original position. Thus, the electrical conductors serve two purposes, they conduct electrical current to the armature and they restore the armature and shaft 2 to their rest position.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the U.S. is:

1. An electromagnetic fuel control element comprising, in combination, a housing, an outer roller path body mounted on said housing, an inner roller path body disposed within said housing, an electromagnetically actuatable armature rotatably supported within said housing for a repeatable rotary movement with said inner roller path body throughout a limited rotary angle, a plurality of elastically deformable electrical current conductors each connected at one end to one of a plurality of contact pins supported by said outer roller path body, the other end of each of said conductors secured to one of another plurality of contact pins supported by said inner roller path body, said conductors being arranged in a loop-like configuration between said inner and outer roller path bodies whereby upon rotation of said armature and said inner roller path body through said rotary angle with respect to said housing, said conductors roll off one of said roller path bodies and roll up on the other of said roller path bodies.

2. An electromagnetic fuel control element in accordance with claim 1 wherein said outer roller path body includes an outer roller path facing each of said current conductors and wherein said inner roller path body includes an inner roller path facing each of said current conductors, said outer roller path extending eccentrically with respect to said inner roller path whereby the distance between said inner roller path and said outer roller path increases in the roll-off direction of said current conductors from said outer roller path.

3. An electromagnetic fuel control element in accordance with claim 1 wherein said current conductors are of strip-like configuration.

4. An electromagnetic fuel control element in accordance with claim 1, including an electrical plug on said housing and wherein the ends of said current conductors are formed with eyelets and wherein said inner roller path body and said outer roller path body are provided with recesses for accommodating the ends of said current conductors formed with said eyelets, said plurality of contact pins each having one end inserted into one of said eyelets in electrical connection with said current conductors, the other ends of said contact pins connected in an electrically conductive relationship with one of said armature and said plug.

5. An electromagnetic fuel control element as claimed in claims 1, 2, 3 or 4, wherein:
said current conductors are made of an elastic metallic material.